US012687740B2

(12) United States Patent
Geng et al.

(10) Patent No.: US 12,687,740 B2
(45) Date of Patent: Jul. 21, 2026

(54) AR GLASSES

(71) Applicant: GOERTEK TECHNOLOGY CO., LTD., Qingdao (CN)

(72) Inventors: Lin Geng, Weifang (CN); Zhongmei Xue, Weifang (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 295 days.

(21) Appl. No.: 18/561,094

(22) PCT Filed: Jun. 27, 2022

(86) PCT No.: PCT/CN2022/101407
§ 371 (c)(1),
(2) Date: Nov. 15, 2023

(87) PCT Pub. No.: WO2023/274109
PCT Pub. Date: Jan. 5, 2023

(65) Prior Publication Data
US 2024/0255776 A1     Aug. 1, 2024

(30) Foreign Application Priority Data

Jun. 30, 2021     (CN) .......................... 202110742465.4

(51) Int. Cl.
*G02C 5/00*          (2006.01)
*G02B 27/01*         (2006.01)
(52) U.S. Cl.
CPC ......... *G02C 5/008* (2013.01); *G02B 27/0176* (2013.01); *G02B 2027/0178* (2013.01)
(58) Field of Classification Search
CPC . G02C 5/00; G02C 5/008; G02C 5/14; G02C 5/18; G02C 11/10; G02B 7/02; G02B 27/01; G02B 27/0176; G02B 2027/0178
(Continued)

(56) References Cited

U.S. PATENT DOCUMENTS 10,904,667 B1 *  1/2021  Zhong ..................... G02C 11/10
2012/0127423 A1  5/2012  Blum et al.
(Continued)

FOREIGN PATENT DOCUMENTS

CN       107367843 A    11/2017
CN       206757196 U    12/2017
(Continued)

OTHER PUBLICATIONS

International Search Report from International Application No. PCT/CN2022/101407 mailed Sep. 20, 2022.

*Primary Examiner* — Thomas K Pham
*Assistant Examiner* — Justin W. Hustoft
(74) *Attorney, Agent, or Firm* — Shih IP Law Group, PLLC

(57)                ABSTRACT

AR glasses comprise a frame, two glasses legs and at least one electronic device; the frame comprises multiple layers of shell structures stacked along a thickness direction of the frame which are enclosed together to form a mounting cavity disposed along a circumferential direction of the frame opening, the mounting cavity comprises a first side wall constituting a side wall of the frame opening, a second side wall away from the frame opening, and an inner end wall and an outer end wall disposed in sequence in the thickness direction of the frame, at most two of them are disposed on any one layer of shell structure. The problem of the inconvenient mounting the electronic device on the frame is improved.

9 Claims, 3 Drawing Sheets

(58) Field of Classification Search
USPC ............................................. 345/633; 359/13
See application file for complete search history.

(56) References Cited

U.S. PATENT DOCUMENTS

| | | | |
|---|---|---|---|
| 2013/0208233 A1 | 8/2013 | Wang | |
| 2016/0103339 A1 | 4/2016 | White et al. | |
| 2018/0136491 A1 | 5/2018 | Ashwood et al. | |
| 2018/0292672 A1* | 10/2018 | Patin ...................... | G02C 7/083 |

FOREIGN PATENT DOCUMENTS

| | | |
|---|---|---|
| CN | 107703628 A | 2/2018 |
| CN | 109771254 A | 5/2019 |
| CN | 209879145 U | 12/2019 |
| CN | 210573073 U | 5/2020 |
| CN | 111240023 A | 6/2020 |
| CN | 112379521 A | 2/2021 |
| CN | 112394519 A | 2/2021 |
| CN | 112965252 A | 6/2021 |
| CN | 113406803 A | 9/2021 |

* cited by examiner

<u>2</u>

21

22

3

23

AR GLASSES

The present disclosure claims a priority to the Chinese Patent Application No. 202110742465.4, entitled "AR GLASSES" filed with China Patent Office on Jun. 30, 2021, the entire contents of which are incorporated into the present disclosure by reference.

TECHNICAL FIELD

The present disclosure relates to a technical field of virtual reality equipment, and more particularly, to AR glasses.

DESCRIPTION OF RELATED ART

A frame of Augmented Reality (AR) glasses generally comprises a frame bracket in the middle, an interior decoration shell positioned inside of the frame bracket, and an exterior decoration shell positioned outside of the frame bracket. In the prior art, an annular groove with an outer opening is provided on the frame bracket, and the annular groove is disposed around a frame opening of the frame, so that electronic devices such as FPC are installed in the annular groove. However, the annular groove is small, and it is very inconvenient to install the electronic devices.

SUMMARY

A main object of the present disclosure is to provide AR glasses, aiming to solve the problem of inconvenient mounting of the electronic devices on the frame in the prior art.

In order to achieve the above object, the present disclosure provides AR glasses, comprising:

a frame having a frame opening for mounting lens, wherein the frame comprises multiple layers of shell structures stacked along a thickness direction of the frame, the multiple layers of shell structures enclosed together to form a mounting cavity disposed along a circumferential direction of the frame opening, the mounting cavity comprises a first side wall constituting a side wall of the frame opening, a second side wall away from the frame opening, and an inner end wall and an outer end wall disposed in sequence in the thickness direction of the frame, the first side wall, the second side wall, the inner end wall, and the outer end wall are disposed on the multiple layers of shell structures separately, and at most two of the first side wall, the second side wall, the inner end wall and the outer end wall are disposed on any one layer of shell structure;

two glasses legs movably connected to both ends of the frame respectively; and at least one electronic device disposed in the mounting cavity.

Optionally, the multiple layers of shell 1 structures comprise an inner shell, a frame bracket and an outer shell, and the inner shell, the frame bracket and the outer shell define a mounting cavity.

Optionally, the first side wall, the second side wall and the inner end wall are separately disposed on the inner shell and the frame bracket, and the outer end wall is disposed on the outer shell.

Optionally, the first side wall and the second side wall are separately disposed on the inner shell and the frame bracket, and the inner end wall is disposed on the frame bracket.

Optionally, the first side wall is disposed on the inner shell, and the second side wall and the inner end wall are disposed on the frame bracket.

Optionally, the frame bracket comprises:

a bracket body provided with a central opening, wherein a part of an outer portion of the bracket body surrounding the central opening forms the inner end wall; and a central protrusion disposed on an outer side of the bracket body and disposed around a periphery of the central opening to form the second side wall, the inner shell comprises:

an inner shell body provided with an inner opening; and an inner protrusion provided outside of the inner shell body and disposed along an edge of the inner opening, wherein the inner protrusion passes through the central opening to form the first side wall, and the outer shell is provided with an outer opening, wherein the outer opening is connected with the central opening and the inner opening to form the frame opening, and a portion of the outer shell surrounding the outer opening constitutes the outer end wall.

Optionally, the inner shell, the frame bracket and the outer shell are bonded by adhesive.

Optionally, the electronic device is disposed on the frame bracket.

Optionally, the electronic device comprises FPC.

Optionally, each of the glasses legs comprises an inner leg shell, a leg shell bracket and an outer leg shell disposed along a thickness direction of the glasses legs.

Optionally, the electronic devices are provided in plural, and one electronic device is provided on the leg shell bracket.

Optionally, the leg shell bracket is rotatably connected to the frame bracket.

According to the technical solution of the present disclosure, the first side wall, the second side wall, the inner end wall and the outer end wall are formed on the multiple layers of shell structures, and at most two of the first side wall, the second side wall, the inner end wall and the outer end wall are disposed on any one layer of shell structure, thus, three of the first side wall, the second side wall, the inner end wall and the outer end wall will not be concentratedly disposed on one layer of shell structure to enclose and form a U-shaped groove, which is inconvenient to dispose electronic devices in the U-shaped groove. That is, according to the technical solution of the present disclosure, at most two of the first side wall, the second side wall, the inner end wall and the outer end wall are concentratedly disposed on one layer of shell structure, so that the three thereof will not be concentratedly disposed on one layer of shell structure to enclose and form the U-shaped groove, which forms a limited space and thus it inconvenient to dispose electronic devices therein. Therefore, in the technical solution provided by the present disclosure, it is convenient to dispose the electronic device on any one layer of shell structure.

BRIEF DESCRIPTION OF DRAWINGS

In order to more clearly illustrate the technical solutions in the embodiments of the present disclosure or in the prior art, the drawings required to be used for the content of the embodiments or the prior art will be briefly introduced in the following. Obviously, the drawings in the following description are merely some embodiments of the present disclosure, and for those of ordinary skill in the art, other drawings can also be obtained from the structure illustrated in the drawings without any creative effort.

Figure 1:
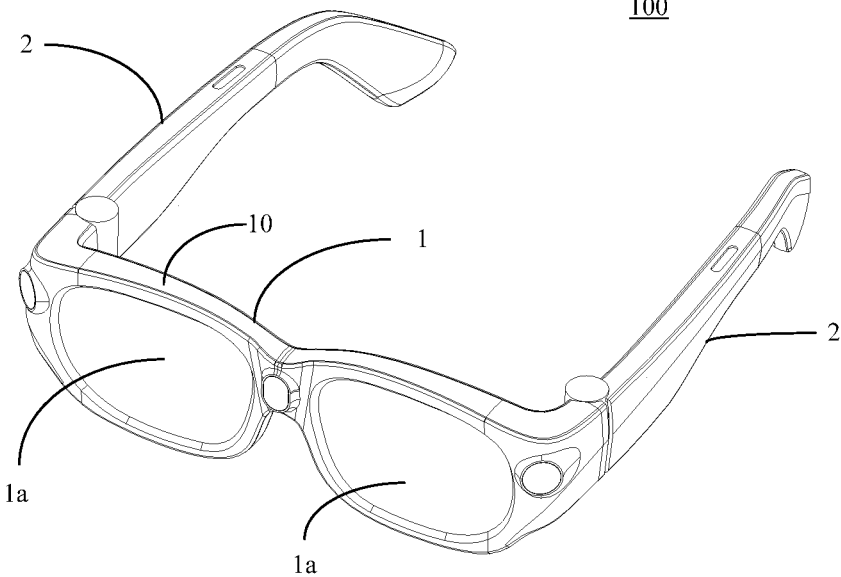
FIG. 1 is a schematic perspective view of AR glasses according to an embodiment of the present disclosure.

Explanation of reference numerals of the embodiments are as below:

| Reference Numeral | Name | Reference Numeral | Name |
| --- | --- | --- | --- |
| 100 | AR | 13a | outer opening |
| 1 | glasses frame | 10 | mounting cavity |
| 1a | frame opening | 101 | first side wall |
| 11 | inner shell | 102 | second side wall |
| 111 | inner shell body | 103 | inner end wall |
| 111a | inner opening | 104 | outer end wall |
| 112 | inner protrusion | 2 | glasses legs |
| 12 | frame bracket | 21 | inner leg shell |
| 121 | bracket body | 22 | leg shell bracket |
| 121a | central opening | 23 | outer leg shell |
| 122 | central protrusion | 3 | electronic device |
| 13 | outer shell | | |

The realization of objects, functional features and advantages of the present disclosure will be further described in conjunction with the embodiments and with reference to the accompanying drawings.

DETAILED DESCRIPTIONS

Technical solutions of embodiments of the present disclosure will be clearly and completely described below with reference to the drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative efforts shall fall within the protection scope of the present disclosure.

It should be noted that all directional indications (such as up, down, left, right, front, back . . . ) in the embodiments of the present disclosure are only used to explain the relative positional relationships and movement conditions, etc. among the components in a specific posture (as shown in the drawings), and if the specific posture changes, the directional indication will also be changed accordingly.

In addition, "first", "second", etc. in the present disclosure are only for descriptive purposes, and should not be construed as indicating or implying their relative importance or implicitly indicating the quantity of indicated technical features. Thus, the features defined with "first", "second", etc. may explicitly or implicitly include at least one of these features. In addition, the meaning of "and/or" herein includes three parallel schemes. For example, the meaning of "A and/or B" includes a scheme A, a scheme B, or a scheme of both A and B. In addition, the technical solutions of various embodiments of the present disclosure can be combined with each other, but it should be based on the fact that the technical solutions can be realized by those skilled in the art. When the combination of technical solutions is contradictory or cannot be realized, it should be considered that the combination does not exist and is not within the scope of protection required by the present disclosure.

Figure 2:
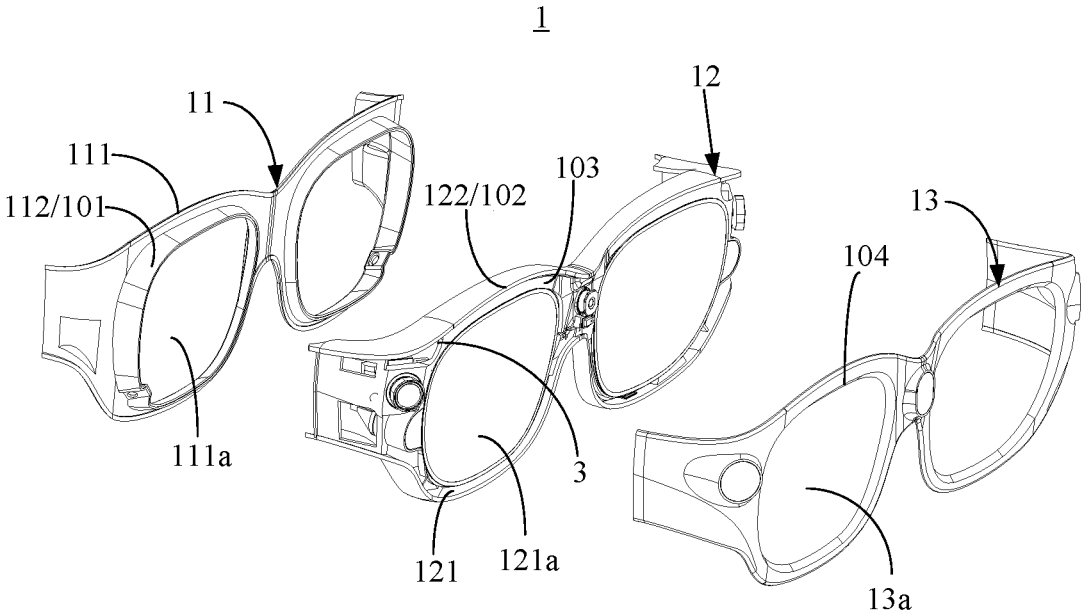
FIG. 2 is a schematic exploded perspective view of a frame in FIG. 1.
Figure 3:
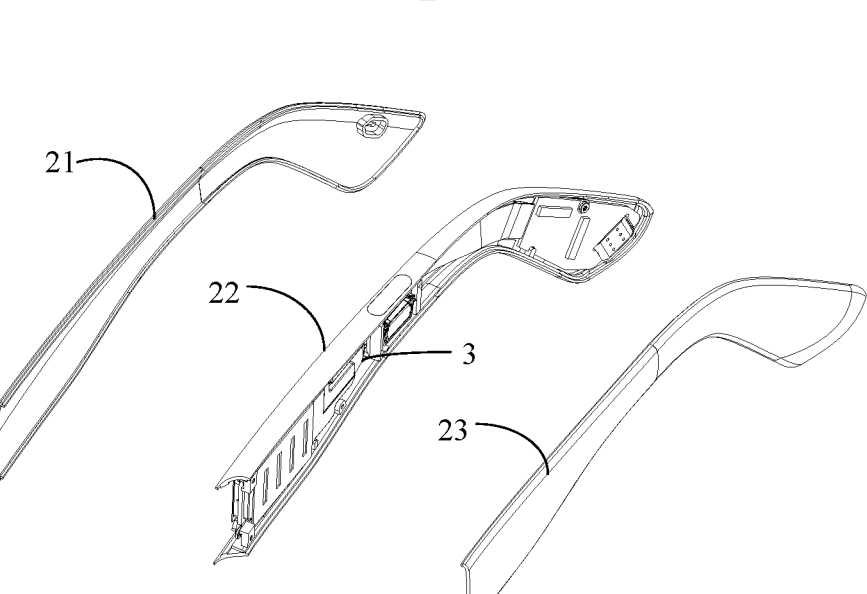
FIG. 3 is a schematic exploded perspective view of glasses legs in FIG. 1.

The present disclosure provides AR glasses 100. FIGS. 1-3 are an embodiment of the AR glasses 100 provided by the present disclosure. Referring to FIGS. 1-3, the AR glasses 100 comprise a frame 1, two glasses legs 2 and at least one electronic device 3. In addition, the AR glasses 100 further comprise lens.

The frame 1 has a frame opening 1a for mounting the lens. Generally, the frame 1 is provided with two frame openings 1a. In some special cases, the frame 1 is provided with one frame opening 1a. The frame 1 comprise s multiple layers of shell structures stacked along a thickness direction of the frame 1 (specifically, in the embodiment, comprises an inner shell 11, a frame bracket 12 and an outer shell 13, obviously it may also be a two layers of shell structures), the multiple layers of shell structures are enclosed together to form a mounting cavity 10 disposed along a circumferential direction of the frame opening 1a, the mounting cavity 10 comprises a first side wall 101 constituting a side wall of the frame opening 1a, a second side wall 102 away from the frame opening 1a, and an inner end wall 103 and an outer end wall 104 disposed in sequence in the thickness direction of the frame 1, wherein the first side wall 101, the second side wall 102, the inner end wall 103 and the outer end wall 104 are disposed on the multiple layers of shell structures separately, and wherein at most two of the first side wall 101, the second side wall 102, the inner end wall 103 and the outer end wall 104 are disposed on any one layer of shell structure.

The two glasses legs are movably connected to both ends of the frame 1 respectively, and the electronic device 3 is disposed in the mounting cavity 10.

It should be noted herein that when the AR glasses 100 are in use, a side facing the user is the inner side, and a side facing away from the user is the outer side, and accordingly, the inner shell 11 is a shell on the side facing the user, and the outer shell 13 is a shell on the side facing away from the user.

In the technical solution of the present disclosure, the first side wall 101, the second side wall 102, the inner end wall 103 and the outer end wall 104 are formed on the multiple layers of shell structures, and at most two of the first side wall 101, the second side wall 102, the inner end wall 103 and the outer end wall 104 are disposed on any one layer of shell structure, thus, three of the first side wall 101, the second side wall 102, the inner end wall 103 and the outer end wall 104 will not be concentratedly disposed on one layer of shell structure to enclose and form a U-shaped groove, which is inconvenient to dispose electronic devices in the U-shaped groove. That is, according to the technical solution of the present disclosure, at most two of the first side wall 101, the second side wall 102, the inner end wall 103, and the outer end wall 104 are concentratedly disposed on one layer of shell structure, so that the three thereof will not be concentratedly disposed on one layer of shell structure to enclose and form the U-shaped groove, which forms a limited space and thus it inconvenient to dispose electronic devices therein. Therefore, in the technical solution provided by the present disclosure, it is convenient to dispose the electronic device on any one layer of shell structure.

In the embodiment, the multiple layers of shell structures comprises an inner shell 11, a frame bracket 12 and an outer shell 13, and the inner shell 11, the frame bracket 12 and the outer shell 13 define one mounting cavity 10. Obviously, alternatively, the inner shell 11 and the frame bracket 12 define one mounting cavity 10, and the outer shell 13 and the frame bracket 12 define one mounting cavity 10, that is, the inner shell 11, the frame bracket 12 and the outer shell 13 define two mounting cavities 10.

To this end, the first side wall 101, the second side wall 102, the inner end wall 103, and the outer end wall 104 are disposed on the inner shell 11, the frame bracket 12 and the outer shell 13 separately. Accordingly, at most two of the first side wall 101, the second side wall 102, the inner end wall 103 and the outer end wall 104 are disposed on the inner shell 11, the frame bracket 12 or the outer shell 13, so that three of the first side wall 101, the second side wall 102, the inner end wall 103 and the outer end wall 104 will not be concentratedly disposed on one of the frame bracket 12, the inner shell 11 and the outer shell 13, to enclose and form a U-shaped groove, which is inconvenient to dispose electronic device 3 in the U-shaped groove. That is, according to the technical solution of the present disclosure, at most two of the first side wall 101, the second side wall 102, the inner end wall 103 and the outer end wall 104 are concentratedly disposed on one of the frame bracket 12, the inner shell 11 and the outer shell 13, so that a U-shaped groove will not be enclosed and formed on the frame bracket 12, the inner shell 11, and the outer shell 13, which forms a limited space and it inconvenient to dispose the electronic devices 3 therein. Therefore, in the technical solution provided by the present disclosure, it is convenient to dispose the electronic device 3 on any one of the frame bracket 12, the inner shell 11 and the outer shell 13.

In the embodiment of the present disclosure, the first side wall 101, the second side wall 102 and the inner end wall 103 are disposed on the inner shell 11 and the frame bracket 12 separately, and the outer end wall 104 is disposed on the outer shell 13. To this end, the design of the structure of the outer shell 13 may be relatively simple.

Further, in the embodiment of the present disclosure, the first side wall 101 and the second side wall 102 are disposed on the inner shell 11 and the frame bracket 12 separately, and the inner end wall 103 is disposed on the frame bracket 12, so that the inner end wall 103 and one of the first side wall 101 and the second side wall 102 are provided on the frame bracket 12. Thus, a cross section of a portion of the frame bracket 12 corresponding to the mounting cavity 10 has an L shape, and no U-shaped groove is formed on the frame bracket 12. Accordingly, when the electronic device 3 is disposed on the frame bracket 12, since an area of the frame bracket 12 corresponding to the mounting cavity 10 has the L shape and is a relatively open area, it can facilitate the mounting of the electronic device 3.

Furthermore, in the embodiment of the present disclosure, the first side wall 101 is disposed on the inner shell 11, and the second side wall 102 and the inner end wall 103 are disposed on the frame bracket 12, so as to facilitate the assembly between the inner shell 11 and the frame bracket 12. Specifically, in the embodiment of the present disclosure, the frame bracket 12 comprises a bracket body 121 and a central protrusion 122, the bracket body 121 is provided with a central opening 121a, a part of an outer portion of the bracket body 121 surrounding the central opening 121a forms the inner end wall 103, and the central protrusion 122 is disposed on the outer side of the bracket body 121 and is disposed around a periphery of the central opening 121a to form the second side wall 102. The inner shell 11 comprises an inner shell body 111 and an inner protrusion 112, the inner shell body 111 is provided with an inner opening 111a, the inner protrusion 112 is provided outside of the inner shell body 111 and is disposed along an edge of the inner opening 111a, and the inner protrusion 112 passes through the central opening 121a to form the first side wall 101. The outer shell 13 is provided with an outer opening 13a, the outer opening 13a is connected with the central opening 121a and the inner opening 111a to form the frame opening 1a, and a portion of the outer shell 13 surrounding the outer opening 13a constitutes the outer end wall 104.

That is, in the embodiment of the present disclosure, the first side wall 101, the second side wall 102 and the inner end wall 103 are not all disposed on the frame bracket 12, so that the U-shaped groove will not be enclosed and formed on the frame bracket 12 by all of the first side wall 101, the second side wall 102 and the inner end wall 103. Thus, when the electronic device 3 is installed on the frame bracket 12, since the U-shaped groove is only opened on one side, an internal space thereof is limited by the first side wall 101 and the second side wall 102, and thus it is inconvenient to dispose the electronic device 3 therein.

In the embodiment of the present disclosure, the second side wall 102 is provided with the electronic device 3, and based on the embodiment in which the second side wall 102 is disposed on the frame bracket 12, it is more convenient that the electronic device 3 is disposed on the second side wall 102, and the design is not limited thereto, alternatively, the electronic device 3 may be disposed on the first side wall 101, or the electronic device 3 may be disposed on the inner end wall 103 and the outer end wall 104.

In the embodiment of the present disclosure, the inner shell 11, the frame bracket 12 and the outer shell 13 are bonded by adhesive. Obviously, the design is not limited thereto, and in other embodiment s of the present disclosure, the inner shell 11, the frame bracket 12 and the outer shell 13 may be connected by a detachable connection structure (such as screws, buckles).

Optionally, in the embodiment of the present disclosure, a positioning fit structure for mutual matching is disposed among the inner shell 11, the frame bracket 12 and the outer shell 13, and the positioning fit structure comprises a notch and a protrusion, thus it is convenient that the inner shell 11, the frame bracket 12 and the outer shell 13 can be mutually positioned and matched.

In the embodiment of the present disclosure, a plurality of electronic devices 3 are provided, and one electronic device 3 is provided on the leg shell bracket 12.

In the embodiment of the present disclosure, the electronic device 3 comprises Flexible Printed Circuit (FPC). The FPC disposed in the mounting cavity 10 is connected with the glasses and a control device. In a case that the electronic device 3 is disposed in the glasses legs 2, the FPC is connected to the control device and an electronic device provided on the glasses legs 2 such as a speaker.

In the embodiment of the present disclosure, each of the glasses legs 2 comprises an inner leg shell 21, a leg shell bracket 22 and an outer leg shell 23 disposed along a thickness direction of the glasses legs 2, so that it is convenient to dispose components such as the electronic device 3 in the glasses legs 2. Specifically, in the embodiment of the present disclosure, the electronic device 3 is disposed on the leg shell bracket 22.

In the embodiment of the present disclosure, the leg shell bracket 22 is rotatably connected to the frame bracket 12. The leg shell bracket 22 and the frame bracket 12, which have good strength, are used as mounting carriers for the frame 1 and the leg shell respectively, and accordingly, the leg shell bracket 22 is rotatably connected to the frame bracket 12, so that the glasses legs 2 are movably installed to both ends of the frame 1.

The above contents are only preferred embodiments of the present disclosure, and thus are not intended to limit the patent scope of the present disclosure. Under the inventive concept of the present disclosure, equivalent structural transformations made by using the description of the present disclosure and the contents of the accompanying drawings, or directly/indirectly applications used in other relevant technical fields, are all included in the patent protection scope of the present disclosure.

What is claimed is:

1. AR (augmented reality) glasses, comprising:
a frame having a frame opening for mounting lens, wherein the frame comprises multiple layers of shell structures stacked along a thickness direction of the frame, the multiple layers of shell structures are enclosed together to form a mounting cavity disposed along a circumferential direction of the frame opening, the mounting cavity comprises a first side wall constituting a side wall of the frame opening, a second side wall away from the frame opening, and an inner end wall and an outer end wall disposed in sequence in the thickness direction of the frame, the first side wall, the second side wall, the inner end wall and the outer end wall are disposed on the multiple layers of shell structures separately, and at most two of the first side wall, the second side wall, the inner end wall and the outer end wall are disposed on any one layer of shell structure;
two glasses legs movably connected to both ends of the frame respectively; and
at least one electronic device disposed in the mounting cavity,
wherein the multiple layers of shell structures comprise an inner shell, a frame bracket and an outer shell, and the inner shell, the frame bracket and the outer shell define a mounting cavity, and
wherein the first side wall and the second side wall are separately disposed on the inner shell and the frame bracket, the inner end wall is disposed on the frame bracket, and the outer end wall is disposed on the outer shell.

2. The AR glasses of claim 1, wherein the first side wall is disposed on the inner shell, and the second side wall and the inner end wall are disposed on the frame bracket.

3. The AR glasses of claim 2, wherein the frame bracket comprises:
a bracket body provided with a central opening, wherein a part of an outer portion of the bracket body surrounding the central opening forms the inner end wall; and
a central protrusion disposed on an outer side of the bracket body and disposed around a periphery of the central opening to form the second side wall,
wherein the inner shell comprises:
an inner shell body provided with an inner opening; and
an inner protrusion provided outside of the inner shell body and disposed along an edge of the inner opening, wherein the inner protrusion passes through the central opening to form the first side wall, and
wherein the outer shell is provided with an outer opening, the outer opening is connected with the central opening and the inner opening to form the frame opening, and a portion of the outer shell surrounding the outer opening constitutes the outer end wall.

4. The AR glasses of claim 1, wherein the inner shell, the frame bracket and the outer shell are bonded by adhesive.

5. The AR glasses of claim 1, wherein the electronic device is disposed on the frame bracket.

6. The AR glasses of claim 1, wherein the electronic device comprises FPC (flexible printed circuit).

7. The AR glasses of claim 1, wherein each of the glasses legs comprises an inner leg shell, a leg shell bracket and an outer leg shell disposed along a thickness direction of the glasses legs.

8. The AR glasses of claim 7, wherein the electronic devices are provided in plural, and one electronic device is provided on the leg shell bracket.

9. The AR glasses of claim 7, wherein the leg shell bracket is rotatably connected to the frame bracket.

* * * * *